United States Patent [19]

Telford

[11] 4,223,772
[45] Sep. 23, 1980

[54] SEMI-AUTOMATIC ROLLER LOCKING CLUTCH

[75] Inventor: Thomas M. Telford, Gladstone, Oreg.

[73] Assignee: Warn Industries, Inc., Kent, Wash.

[21] Appl. No.: 940,963

[22] Filed: Sep. 11, 1978

[51] Int. Cl.$^2$ ............................................. F16D 41/04
[52] U.S. Cl. .................................... 192/48.6; 192/36; 192/44; 192/67 R; 192/94; 192/95; 403/1
[58] Field of Search .................... 192/35, 36, 44, 48.6, 192/67, 94, 95, 114 R; 403/1

[56] References Cited

U.S. PATENT DOCUMENTS

| | | | |
|---|---|---|---|
| 2,684,140 | 7/1954 | Warn | 192/94 X |
| 3,414,096 | 12/1968 | Reed | 192/44 X |
| 3,442,361 | 5/1969 | Hegar | 192/94 X |
| 3,718,213 | 2/1973 | Hegar et al. | 192/95 X |

FOREIGN PATENT DOCUMENTS 803907 11/1958 United Kingdom ................. 192/67 R Primary Examiner—Allan D. Herrmann
Attorney, Agent, or Firm—Graybeal & Uhlir

[57] ABSTRACT

A semi-automatic roller type locking clutch for use between concentric rotational driving and driven members comprises a semi-automatic locking means and a manually activated locking means. The semi-automatic locking means is adapted to displace a plurality of rollers each disposed within a plurality of grooves circumferentially disposed on one member up onto one edge of the grooves and into contact with one edge of each of a plurality of grooves disposed on the other member whenever the driving member rotates faster than the driven member. The manually activated locking means is adapted to urge a clutch ring member slidably splined to one member into splined engagement with the other member when the members are nonrotational with respect to each other.

9 Claims, 6 Drawing Figures

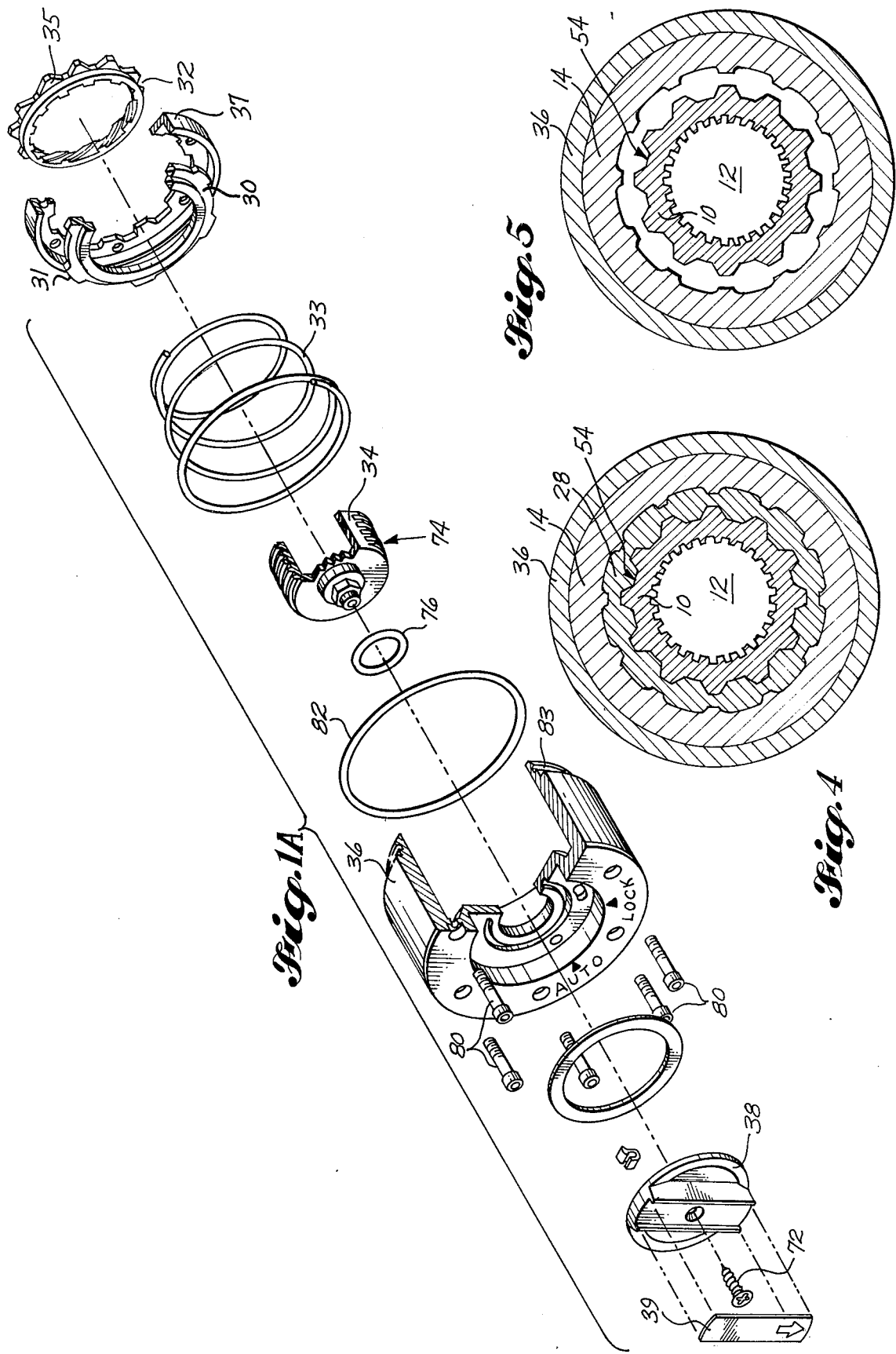

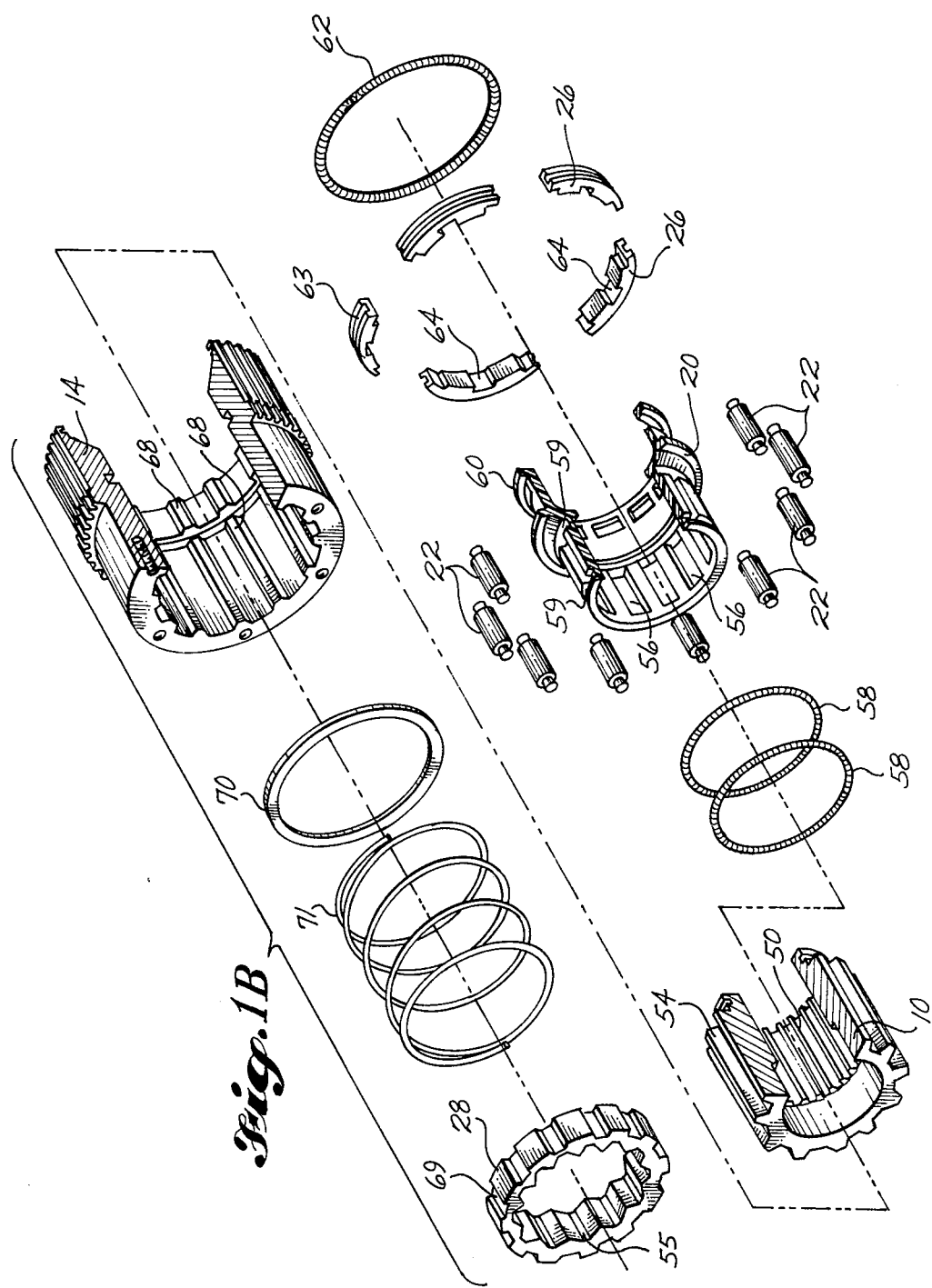

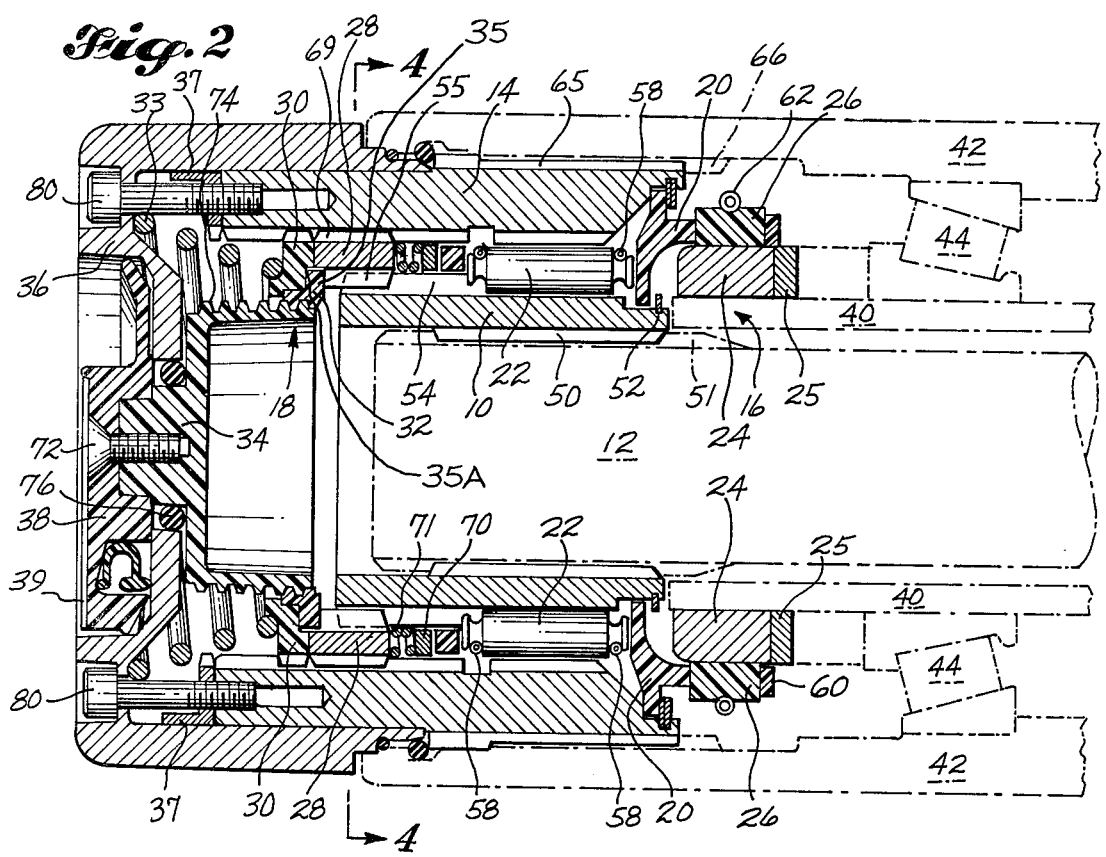
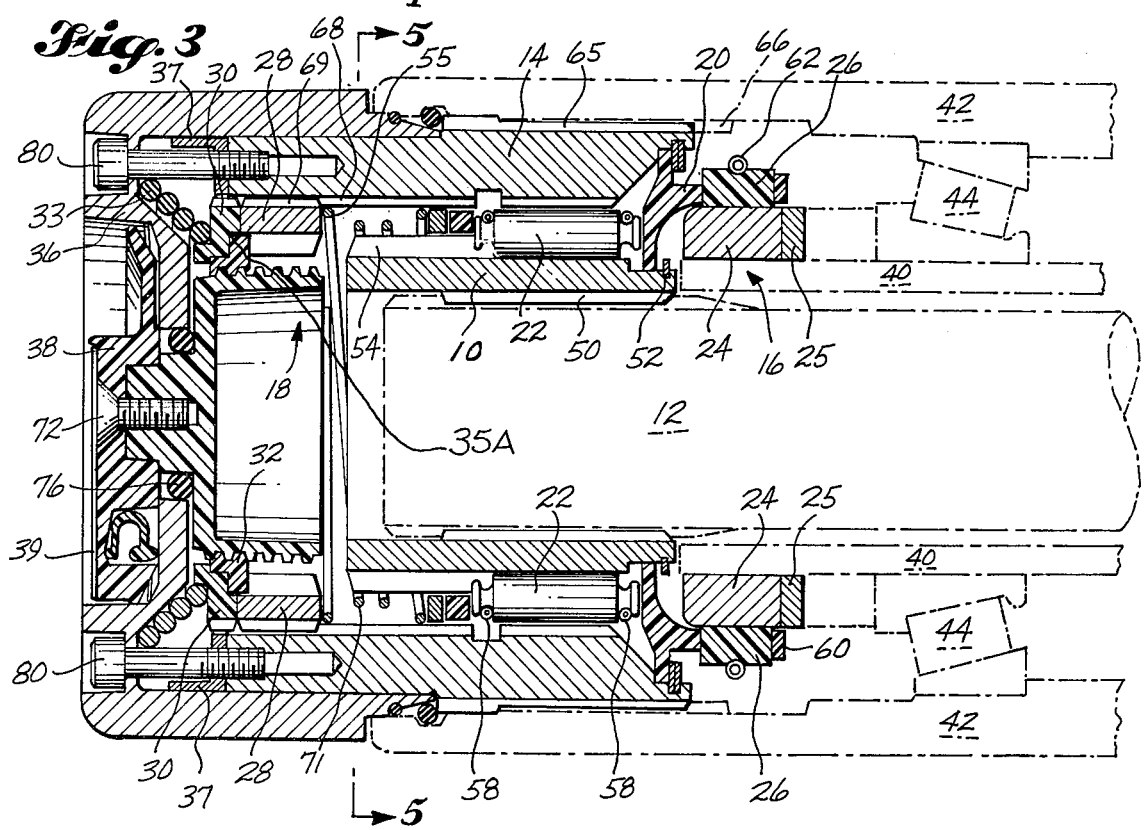

SEMI-AUTOMATIC ROLLER LOCKING CLUTCH

DESCRIPTION

1. Technical Field

This invention relates to a clutch means and more particularly to a semi-automatic roller type locking clutch especially adapted for use in a four wheel drive vehicle or the like.

2. Background Art

Clutches for automatically or manually locking rotational, concentric members are old in the art. Typical of such clutches is that shown in U.S. Pat. No. 3,414,096, issued to G. R. Reed. This patent discloses a roller engaging means disposed between the concentric members. The roller engaging means has an axially extending portion thereon adapted to contact a manually or automatically actuated restraining means to urge the clutch into a locked condition. With the disclosed clutch in the manual mode, the manually actuated restraining means engages the axially extending portion and urges the roller engaging means into a wedging engagement between the concentric members thereby producing clutch lockup. In the automatic mode, the same roller engaging means is urged into a wedging engagement between the concentric members by the occurence of relative rotational movement between the members. The use of the same roller engaging means to provide clutch lockup in both the manually activated and automatically activated modes of clutch operation is undesirable since the clutch will then become susceptible to strength and durability limitations inherent in the roller engaging means.

The present invention overcomes this limitation by providing separate and independent means for manual and automatic clutch lockup. In the manual mode of clutch operation, a manually actuated locking means urges a clutch ring slidably splined to one member into a splined engagement with the other member. This provides a positive and reliable connection between the concentric members. In addition, the present invention also provides a means whereby the clutch ring remains in a stationary phased relation with respect to the manually activated dialing mechanism as the clutch ring is urged into and out of splined engagement with the other member.

DISCLOSURE OF THE INVENTION

According to one aspect of the present invention, a semi-automatic roller type locking clutch for use between rotational, concentric driving and driven members, with one of the members having a plurality of axially extending grooves opening radially outwardly toward the other member with each of the grooves having a roller therein, and the other member having a plurality of axially extending grooves opening radially inwardly toward the other grooves comprises a torque responsive means adapted to move the rollers radially out of the grooves up onto one edge thereof and into contact with one edge of each groove within the other member when the driving member rotates faster than the driven member. A clutch ring which is axially slidable along and in a splined engagement with the grooves of one of the members has a plurality of grooves around its inside surface adapted to be urged into a splined engagement with the grooves of the other member. Manually operable means urges the clutch ring into a splined engagement with the members when the members are non-rotational with respect to each other.

The foregoing and other objects, features and advantages of the present invention will become more apparent in light of the detailed description of preferred embodiments thereof set forth hereafter, and illustrated in the accompanying drawings.

BRIEF DESCRIPTION OF THE DRAWINGS

FIG. 1A is an exploded perspective view of one embodiment of a typical semi-automatic roller locking clutch according to the present invention.

FIG. 1B is an exploded perspective view, constituting a continuation of FIG. 1A, and showing still further members of a typical semi-automatic roller locking clutch according to the present invention.

FIG. 2 is a sectional view of a typical semi-automatic roller locking clutch according to the present invention, showing the clutch in the manually locked mode.

FIG. 3 is a sectional view of a typical semi-automatic roller locking clutch according to the present invention, showing the clutch adapted for automatic lockup.

FIG. 4 is a cross-sectional view of a typical semi-automatic roller locking clutch taken along lines 4—4 of FIG. 2.

FIG. 5 is a cross-sectional view of a typical semi-automatic roller locking clutch taken along lines 5—5 of FIG. 3.

BEST MODE OF CARRYING OUT THE INVENTION

In one embodiment of the present invention, as shown in FIGS. 1A and 1B, a semi-automatic roller locking clutch comprises an axle shaft hub 10 coaxially disposed about an axle shaft 12, an outer body 14 coaxially disposed about the axle shaft hub and in spaced apart relation therefrom, a semi-automatic locking means shown generally at 16, disposed coaxially between the axle shaft hub and the outer body, and a manually activated locking means, shown generally at 18, disposed adjacent the semi-automatic locking means and coaxially around the inside diameter of the outer body. With reference to FIGS. 1A and 1B, the semi-automatic locking means generally comprises a cage 20 containing a plurality of rollers 22 therein, a drag nut 24 rigidly secured to a spindle 40 (not itself part of the invention) such that the drag nut does not rotate with respect to either the axle shaft hub or the outer body, and a drag show 26 disposed annularly at one end of the cage and in a frictional engagement with the drag nut. The manually activated locking means comprises a clutch ring 28 slidably splined to the outer body and slidably engageable to the axle shaft hub, a clutch cup 30 disposed adjacent the clutch ring and slidably splined to the outer body, a clutch nut 32 disposed partially within the clutch cup and slidably splined to the clutch ring, and a dial screw 34 adjacent the axle shaft hub and in threaded relationship with the clutch nut. A cap 36 having a dial member 38 therein is secured to the outer body, and together with the wheel hub 42 forms a protective enclosure for the axle shaft hub, the semi-automatic locking means, and the manually activated locking means.

With reference to FIGS. 2 and 3, the spindle 40 is coaxially disposed about a portion of the axle shaft 12 and is in a spaced apart relation thereto. The spindle 40 is rigidly secured to the vehicle and does not rotate with respect to the axle shaft 12 or the wheel hub 42. The wheel hub 42 is rotatably engaged to the spindle 40 by bearing 44. The wheel hub 42, bearing 44, and spindle 40 are shown as part of the four-wheel drive vehicle and are not of themselves part of the present invention.

A spindle drag nut is coaxially disposed about the spindle 40 and is secured from rotation thereon such as by the use of a plurality of threads circumferentially and coaxially disposed along the inside surface of the spindle drag nut. A lock washer 25 is also disposed about the spindle 40 and abuts the spindle drag nut 24 and prevents the drag nut from axial movement along the spindle.

The axle shaft hub 10 is coaxially disposed about a portion of the axle shaft 12 and is in engagement therewith by means of a plurality of splines 50 circumferentially disposed coaxially along the inside surface of the axle shaft hub 10 engaging a corresponding plurality of splines 51 coaxially disposed about a portion of the outside surface of the axle shaft 12. A circular clamp 52, disposed adjacent the spindle 40 and at one end of the axle shaft hub 10, further secures the axle shaft hub to the axle shaft. The axle shaft hub 10 has a plurality of grooves 54 disposed circumferentially and coaxially along the entire length of its outside surface. Each groove has a width larger than the radius of the plurality of rollers 22 disposed therein, thereby permitting the rollers to travel up the sides or edges of the grooves 54 and into contact with one edge of each of the plurality of grooves disposed within the inside surface of the outer body 14 as will be more fully discussed below.

A cage 20 is coaxially disposed between the axle shaft hub 10 and the outer body 14. The cage 20 contains a plurality of openings or windows 56 having the plurality of rollers 22 disposed therein. The rollers 22 are urged against radial movement away from the cage by a plurality of roller springs 58 disposed at either end of the rollers 22 and contained within a plurality of roller spring grooves 59 disposed circumferentially around the cage 20. In the preferred embodiment, the cage 20 is in a slightly spaced apart relation with respect to the axle shaft hub 10, with the plurality of rollers 22 engaging the axle shaft hub being at the bottom of the plurality of grooves 54 therein (see FIG. 1B). The cage 20 has an annular portion 60 at one end thereof, with the annular portion adapted to carry the drag shoe 26. The cage 20 is constructed from a material having sufficient elasticity so as to return to its original shape after it is deformed, as occurs when a roller 22 becomes momentarily pinched between grooves 54, 68. In the preferred embodiment, the material is nylon having a glass fiber content of between twenty to forty percent by weight, which material is commonly known as nylon 6/6.

A drag shoe 26 is coaxially disposed about the axle shaft 12 and is in slidable contact with the spindle drag nut 24. The drag shoe 26 is maintained in substantially constant frictional contact with the spindle drag nut 24 by a tension spring 62 circumferentially disposed around the drag shoe and disposed within a tension spring groove 63 within the drag shoe. In the preferred embodiment, the drag shoe 26 is segmented into five equal sections to facilitate assembling the drag shoe circumferentially around the drag nut 24 and within the annular portion 60 of the cage 20. Each segmented section of the drag shoe contains a plurality of axle relief mills, shown generally at 64, disposed therein to facilitate the bending or the flexing of the drag shoe toward the spindle drag nut as relative wear occurs between these members. In the preferred embodiment, the drag shoe is constructed of a plastic material, typically LNP nylon 6/6 comprising fifteen percent teflon and thirty percent carbon fiber which is commonly known in the trade as RCL 4036, or of Dupont KS 205 Arimid resin.

The outer body 14 is coaxially disposed about the axle shaft hub 10 and cage 20 and is in spaced apart relation therefrom. The outer body 14 is splined to the wheel hub 42 by a plurality of splines 65 extending axially and circumferentially around the outside surface of the outer body, and by a corresponding plurality of splines 66 circumferentially disposed along the inside surface of the wheel hub 42 (see FIGS. 2, 3). A plurality of grooves, of flutes 68 extend axially and circumferentially along the inside surface of the outer body 42. In the preferred embodiment, the flutes 68 are of trapezoidal cross-section with the circumferential spacing between adjacent flutes being slightly wider than the diameter of the plurality of rollers 22. With reference to FIG. 2, in the manually activated locking mode a portion of the flutes 68 provide a means for splining the clutch ring to be axially slidable therealong and engage the axle shaft hub 10, thereby locking the axle shaft 12 to the wheel hub 42. Another portion of the flutes 68 are adapted to engage the plurality of rollers 22 when they move radially out of the grooves 54 and up onto one edge thereof, thereby locking the axle shaft to the wheel hub when the clutch is operated in the semi-automatic locking mode. The portions of the flutes providing clutch lockup in either the semi-automatic locking mode or the manually activated locking mode are of the same cross-section and are axially aligned with each other along the inside surface of the outer body 14.

A clutch ring 28 is disposed circumferentially around the inside surface of the outer body 14 at one end thereof and is in axially slidable splined engagement with the outer body through the plurality of flutes 68 disposed thereon and by a corresponding plurality of splines 69 circumferentially disposed around the outside surface of the clutch ring. The clutch ring 28 has a plurality of grooves 55 disposed circumferentially around the inside surface thereof adapted to be urged into a splined engagement with the plurality of grooves 54 disposed circumferentially around the outside surface of axle shaft hub 10. A bushing bearing 70 and a disengagement spring 71, both disposed circumferentially around the outside surface of the axle shaft hub 10 between the axle shaft hub and the outer body 14, urge the clutch ring 28 out of splined engagement with the outer body and the axle shaft hub. In the preferred embodiment, the clutch ring is constructed from 86L20 steel.

A dial member 38 disposed adjacent the clutch ring 28 and the outer body 14 is secured to a dial screw 34 by a dial attaching screw 72, dial ring 73 and detent 75. The dial screw 34, having a plurality of threads 74 circumferentially around the outside surface thereof, is disposed coaxially adjacent the axle shaft 12 and the axle shaft hub 10, and coaxially within and in spaced apart relation with the clutch ring 28 when the clutch ring is disposed at one end of the outer body 14 (see FIGS. 2 and 3). The dial member 38 has a dial indicator 39 attached thereto to indicate either the LOCK or AUTO mode of operation for the clutch, as described below. A dial seal 76 is disposed circumferentially around the dial screw 34 between the dial screw and the dial member.

A clutch cup 30, disposed adjacent the clutch ring 28 and coaxially around the dial screw 34 and spaced apart therefrom, is in a splined engagement with the outer body 14 through a plurality of splines 31 disposed circumferentially around the outside surface of the clutch cup 30 and a corresponding plurality of splines 68 disposed upon the inside surface of the outer body. The clutch cup has a plurality of pockets 35A (see FIGS. 2, 3) therein adapted to engage a plurality of teeth 35 (see FIG. 1A) disposed circumferentially around the outside surface of the clutch nut is in a threaded engagement with the dial screw and in a splined engagement with the inside surface of the clutch ring 28 by the plurality of grooves 55 disposed thereon and by the corresponding plurality of teeth 35. With reference to FIGS. 2, 3, the clutch cup 30, clutch nut 32, and clutch ring 28 are adapted to move axially along the inside surface of the outer body 14 as the dial screw 34 is manually rotated. As will be discussed more fully below, the clutch nut 32 is also adapted to be axially displaced away from the clutch cup 30 along the plurality of grooves 55 within the clutch ring in the event the grooves 55 are not in a splined alignment with grooves 54 within the axle shaft hub as the dial screw 34 is rotated. Since the clutch cup 30 and clutch ring 28 are both separately splined to the outer body 14, and since the clutch nut 32 is splined to the inside surface of the clutch ring, the timing or phasing between the clutch cup 30, the clutch nut 32 and the clutch ring 28 always remains stationary as these members are axially moved along the inside surface of the outer body. In the preferred embodiment, the clutch cup 30 and clutch nut 32 combination is typically no thicker than about one quarter of an inch. An engagement spring 33 disposed between the clutch cup 30 and the dial member 38 urges clutch ring 28 into a simultaneous splined engagement with the axle shaft hub and outer body as the dial member is rotated from the AUTO to the LOCK position.

A cap 36 is disposed adjacent the wheel hub 42 and is rigidly secured to the outer body 14 by a plurality of screws 80. A wheel hub retaining spring 82 is disposed at one end of the cap within groove 83 and further secures the cap 36 to the outer body. The cap provides a protective enclosure for the dial screw member 34, the semi-automatic locking means, and the manually activated locking means.

A timing sleeve 37 is disposed adjacent the outer body 14 and within the cap 36. The timing sleeve 37 is adapted to engage the plurality of clutch cup splines 31 and prevents the clutch cup 30 from rotating with respect to cap 36 when the cap is separated from the outer body as may occur in the shipping and installation of the present invention on a vehicle. After the cap is secured to the outer body, the timing sleeve has no function but remains in place in the event the cap is subsequently removed from the outer body.

With reference to FIGS. 2 and 3, the operation of the semi-automatic roller type locking clutch for both the AUTO and LOCK modes is next described.

AUTO MODE

When the clutch is in the semi-automatic mode of operation (for example, with the dial indicator 39 in AUTO position) the axle shaft 12 and the wheel hub 42 are free to rotate in a direction corresponding to the direction of travel of the vehicle. The slidable clutch ring 28 is urged to one end of the outer body 14 adjacent the axle shaft hub 10 and in spaced apart relation thereto. As the axle shaft 12 begins to rotate, the axle shaft hub 10, being splined to the axle shaft, rotates with the axle shaft. The cage 20 and the plurality of rollers 22 therein initially rotate with the axle shaft hub. The rotational movement is resisted by the inherent torque generated by the drag shoe 26 as it slidably moves with respect to the stationary drag nut 24. This torque produces a twisting of the cage 20, displacing the plurality of rollers 22 within the grooves 54 causing the rollers to travel radially up on edge thereof. As the axle shaft continues to rotate, the plurality of rollers engage one edge of each of the plurality of flutes 68 disposed within the axle shaft hub. This results in a lockup between the axle shaft hub and the outer body. Additional driving torque imparted to the axle shaft is thereafter coupled through the axle shaft hub and the plurality of rollers to the outer body and wheel hub. This condition continues as long as the axle shaft rotates as fast as, or faster than the wheel hub. When the rotational speed of the axle shaft hub is less than the rotational speed of the wheel hub, as occurs when the throttle of the vehicle is suddenly released, the plurality of flutes in the outer body urge the plurality of rollers down the edge of the grooves contained within the axle shaft hub, thereby allowing free rotation of the outer body and the wheel hub with respect to the axle shaft and axle shaft hub.

LOCK MODE

In the manually activated locking mode (for example, with the dial indicator 39 in LOCK position), the slidable clutch ring 28 is urged into a splined engagement with the axle shaft hub 10 by the clutch cup 30 and the clutch nut 32. In this mode of operation, the clutch ring 28 is simultaneously splined to both the axle shaft hub 10 and the outer body 14 producing a continuous lockup between the axle shaft and the wheel hub for all rotational speeds therebetween.

If the slidable clutch ring 28 does not immediately become splined to the axle shaft hub, as occurs when the grooves 54 on the axle shaft hub are misaligned with respect to the grooves 55 within the clutch ring 28, continuous rotation of the dial member 38 and the dial screw 34 causes the clutch nut 32 to become axially separated from the clutch cup 30. When alignment of the grooves on the axle shaft hub and the clutch ring occurs, the engagement spring 33 urges the clutch ring into a splined engagement with the axle shaft hub and the clutch cup into engagement to the LOCK setting, alignment or phasing of the clutch cup, the clutch nut, and the clutch ring is maintained by slidably splining the clutch nut to the inside surface of the clutch ring.

When the dial member 38 and the dial screw 34 is rotated from the LOCK position back to the AUTO position, the dial screw 34 pulls the clutch nut 32 and the clutch cup 30 axially away from the axle shaft 12 thereby compressing the engagement spring 33. When this occurs, the disengagement spring 71 expands thereby forcing the clutch ring 28 axially along the splines 68 disposed within the outer body and out of the splined engagement with the axle shaft hub 10. The axle shaft hub is then free to rotate with respect to the wheel hub and will automatically lock to the wheel hub as has been above described.

INDUSTRIAL APPLICABILITY

The present invention has industrial application in any situation where it is desirable to lock rotational concentric driving and driven rotational members. It is particularly well adapted for use in four wheel drive vehicles or the like.

I claim:

1. In a semi-automatic roller type locking clutch for use between rotational, concentric driving and driven members, with one of said members having a plurality of axially extending grooves therein opening radially outwardly toward said other member with each of said grooves having a roller disposed therein, and the other member having a plurality of axially extending grooves therein opening radially inwardly toward said other grooves, said clutch comprising:

(a) torque responsive means moving each of said rollers radially out of its groove up onto one edge thereof and into contact with one edge of each groove disposed within said driven member whenever said driving member rotates faster than said driven member;

(b) a clutch ring axially slidable along and in splined engagement with one of said members, said clutch ring being urgeable into a simultaneous splined engagement with the other of said members; and (c) a dial member having a dial screw extending within and spaced apart from said clutch ring;

(d) a clutch cup abutting said clutch ring and disposed around and in spaced apart relation from said dial screw, said clutch cup being axially slidable along one of said members;

(e) a clutch nut abutting said clutch ring and in threaded engagement with said dial screw, said clutch nut being slidably engaged to said clutch ring and movable axially along said dial screw apart from said clutch nut as said dial member is rotated and said clutch ring is not urged into a simultaneous splined engagement with said other member; and (f) means urging said clutch cup into said clutch ring and said clutch ring into a simultaneous splined engagement with said members when said members are nonrotational and said dial member is rotated.

2. The clutch of claim 1, wherein said clutch cup has a plurality of pockets disposed on one side thereof, said pockets being adapted to engage and mesh with said plurality of teeth disposed around the outside surface of said clutch nut when said clutch nut abuts said clutch cup.

3. The clutch of claim 1, wherein said plurality of grooves disposed within driven member adapted to engage said rollers, and said grooves in said driven member adapted to engage said clutch ring, are of the same shape and are axially aligned with each other.

4. The clutch of claim 1, wherein the combination of said clutch cup and said clutch nut have an axial thickness of substantially one quarter of an inch.

5. The clutch of claim 1, wherein said torque responsive means comprises:

(a) a cage rotatably disposed between said concentric members and in a slidable contact with said driven member said cage having said plurality of rollers therein;

(b) a spindle drag nut disposed between said concentric members and in a stationary spaced apart relationship thereto; and, (c) a drag shoe disposed at one end of said cage and adapted to be slidably movable over said spindle drag nut such that as said drag shoe moves over said drag nut upon initial rotation of said driving member, the torque generated thereby rotates said cage causing said rollers to move radially out of said grooves up onto one edge thereof and into contact with one edge of each groove disposed within said driven member.

6. The clutch of claim 5, wherein said cage is constructed from a material having sufficient elasticity so as to return to its original shape when deformed.

7. The clutch of claim 6, wherein the cage is constructed from nylon having a glass fiber content of between about twenty to forty percent of the weight of said cage.

8. A manually operable means for locking rotational, concentric driving and driven members each having a plurality of axially extending grooves therein, with the grooves in one member opening radially toward the grooves in said other member comprising:

(a) a clutch ring being axially slidable along and in splined engagement with the grooves of one of said members, said clutch ring having a plurality of grooves disposed circumferentially along its inside surface thereof adapted to be urged into a splined engagement with the grooves in the other of said members;

(b) a dial member disposed adjacent said clutch ring having a dial screw secured thereto, said dial screw adapted to extend coaxially within said clutch ring and in spaced apart relation thereto;

(c) a clutch cup abutting said clutch ring and disposed about said dial screw in a spaced apart relation thereto, said clutch cup being axially slidable along and in a splined engagement with the grooves of said driven member;

(d) a clutch nut abutting both said clutch ring and said clutch cup and in a threaded engagement with said dial screw, said clutch nut having a plurality of teeth disposed circumferentially around its outside surface thereof adapted to be axially slidable along and in a splined engagement with said grooves disposed within the inside surface of said clutch ring, said clutch nut being adapted to move axially along said dial screw and apart from said clutch nut when said dial member is rotated and said grooves in said clutch ring are not aligned with said grooves in said other member; and, (e) means urging said clutch cup into said clutch ring and said clutch ring into a simultaneous splined engagement with said members as said dial member is rotated.

9. The manually operable means of claim 8, wherein the combination of said clutch cup and said clutch nut have an axial thickness of substantially one quarter of an inch.

* * * * *